Figure 5:
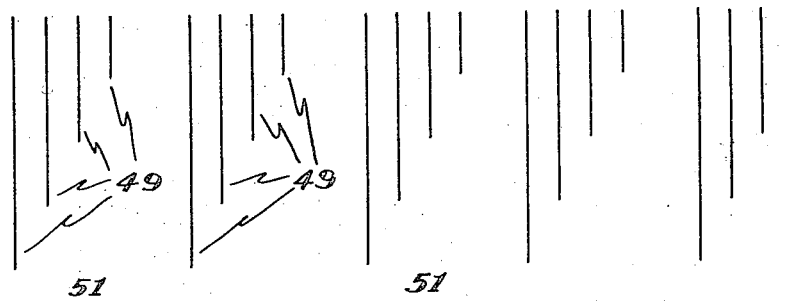

Oct. 31, 1939.　　　　E. G. LINDER　　　　2,178,237
AIRCRAFT LANDING SYSTEM
Filed Aug. 18, 1937　　2 Sheets-Sheet 1
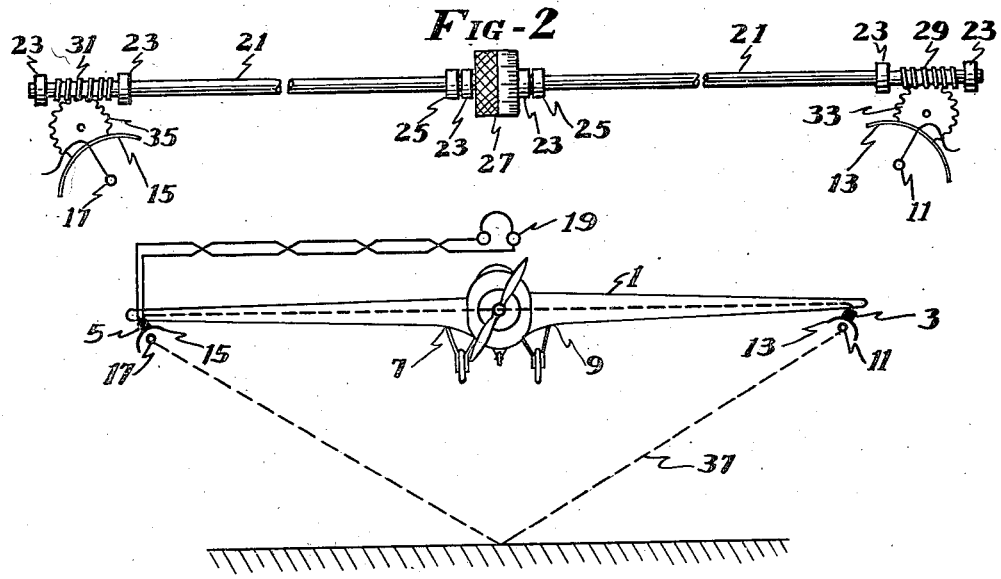
Fig-2
Fig-1
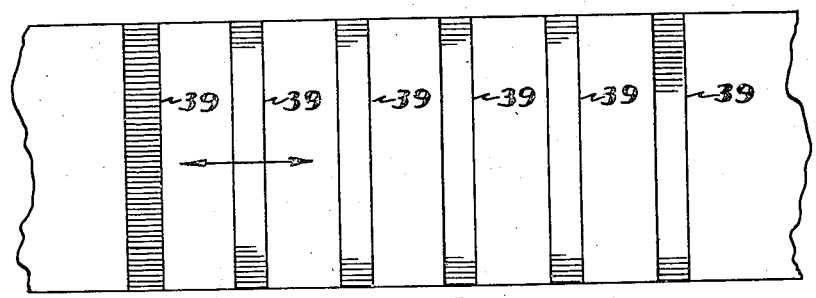
Fig-3
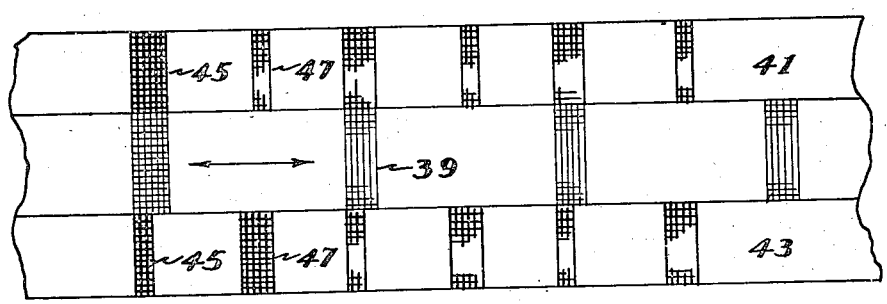
Fig-4
Inventor
Ernest G. Linder.
By
Attorney Oct. 31, 1939.  E. G. LINDER  2,178,237

AIRCRAFT LANDING SYSTEM

Filed Aug. 18, 1937  2 Sheets-Sheet 2

Inventor
*Ernest G. Linder*
By
Attorney

Patented Oct. 31, 1939

2,178,237

UNITED STATES PATENT OFFICE 2,178,237

AIRCRAFT LANDING SYSTEM

Ernest G. Linder, Philadelphia, Pa., assignor to Radio Corporation of America, a corporation of Delaware Application August 18, 1937, Serial No. 159,640

7 Claims. (Cl. 250—1)

My invention relates to an aircraft landing system, in which the aircraft is equipped with a beam type radio transmitter and a receiver for detecting radio waves from said transmitter after the waves are reflected from earth. The landing field may be marked with alternate strips of good and poor reflecting ability to define its boundaries and to convey other information to the pilot of a craft equipped with my invention and flying over the field thus marked.

An antenna for the transmitter is positioned within a reflector on the tip of one of the wings of an aircraft, and a receiver within a similar reflector is placed on the opposite wing tip. The reflectors and antennas may include means for varying the angle of transmission and reception of said beam. The line between the receiver and transmitter serves as a base to determine, by triangulation, the height of the aircraft above a wave reflecting surface.

One of the objects of my invention is to provide means for an aircraft landing system.

An additional object is to provide means for identifying a landing field by alternate strips of good and poor radio wave reflecting material.

A further object is to provide a landing field with variably and/or uniformly spaced strips of good radio wave reflecting material.

My invention may be best understood by reference to the accompanying drawings, in which Figure 1 illustrates an aircraft equipped with a beam radio transmitter, and a radio beam detecting device, Figure 2 is an elevational view of means for changing the angle between the receiver and transmitter, and Figures 3, 4, 5, 6 and 7 are elevational views of portions of landing fields equipped with wave reflecting strips.

Referring to Fig. 1, an airplane 1 is equipped with a radio transmitter 3 and a radio receiver 5 which are mounted near the opposite ends of the wings 7, 9. The transmitter includes an antenna 11, and a reflector 13, which beams the transmitted wave. The receiver 5 includes an antenna 15, a reflector 17, and telephone receivers 19 or other suitable signal indicating instruments.

The angle between the axis of the transmitting reflector 13 and the axis of the receiving reflector 17 may be made adjustable by gear such as is represented in Fig. 2. A shaft 21 is carried by bearings 23. Thrust bearings 25 prevent longitudinal movements of the shaft. A knurled wheel 27, fastened to the shaft 21, rotates the shaft. The ends of the shaft include oppositely threaded worms 29, 31 which engage gear wheels 33, 35. The reflectors 13, 15, including antennas 11, 17, are attached to the gear wheels. The transmitter and receiver 3—5 may be mounted to rotate with the geared wheels or may be fixedly mounted within the aircraft and connected to their respective antennas by suitable leads.

In the operation of the above described devices, I prefer to use an ultra high frequency wave. Waves of ultra high frequency, i. e., five hundred megacycles and upward, may be easily formed into a narrow, sharply defined beam, and readily reflected, and furthermore, may be transmitted by lightweight apparatus occupying a small space compared with apparatus of similar power operating at lower frequencies. The sharply defined beam lends itself to accuracy. The transmitter radiates waves which are beamed by the reflector 13 and are directed downwardly. The transmitted wave, upon striking the earth, is reflected as indicated by the dash line 37 of Fig. 1. The receiver 5 will indicate a maximum response when its reflector is focused on the point from which the transmitted beam is reflected. The line through the transmitter and receiver serves as a base line from which the height of the aircraft above the point of reflection may be calculated by triangulation. The wheel 27 may be calibrated to read the altitude of the aircraft above the landing field.

The landing field runways may be marked as indicated in Figs. 3 and 4. The shaded portions 39 represent strips which are preferably laid at right angles to the length of the runway. The strips are made of a material which is a good reflector of microwaves of the frequency of the transmitter. In most installations where the soil between the strips is a poor reflector compared with the strips, a wire cloth will serve as a reflector. In other installations, the reflector strips may be made of a number of conductors placed parallel to the plane of polarization of the transmitted waves and preferably of such a length that they are resonant to these waves. The parallel conductors or the strips may be placed on or just under the surface of the runway to avoid interference with the landings of aircraft.

An aircraft flying over a marked runway will observe reflections whose frequency is a function of the speed of the craft with respect to the alternate good and poor reflecting strips. As the craft moves off the path over the runway, the frequency note of the reflections will disappear. Thus, the pilot will be advised of his location and speed with respect to the runway.

The runway may be further marked as shown in Fig. 4. The edges 41, 43 are respectively variably marked with narrow and wide markers 45, 47. The central portion is marked with uniformly spaced reflecting strips. Numerous patterns can be arranged to identify different runways or different portions of the same runway. An aircraft approaching a runway can identify its position, without regard to actual visibility, by the reflections from the runway. The pilot of an aircraft can be warned that its altitude is dangerously low when flying over ordinary terrain which will reflect the transmitted wave to the receiver.

Instead of transmitting an unmodulated carrier, the ultra high frequency beam may be modulated by a signaling current. By way of example, one thousand cycles per second may be used as the signaling frequency. The modulated beam may be reflected by groups of successive reflecting surfaces located on or near the surface of the earth. Each element of the group will produce in the aircraft receiver a reflected signal corresponding to a dot, due to the movement of the beam carrying aircraft relative to the reflectors.

By way of example, if reflectors 49 of varying length are spaced in groups 51 as shown in Fig. 5, a beam carrying aircraft passing over the successive reflectors will receive an indication for each reflection. If the waves are received in sequences of four indications, or three indications, it will indicate that the craft is passing over the upper portion of the marked surface. If the sequence of indications is one or two, the aircraft will be passing over the lower portion of the marked area. Changing sequences will indicate that the craft is not moving in a line normal to the reflectors. If the number of indications in the several sequences is increasing, it will indicate that the craft is traveling from the lower left (or right) hand portion toward the upper right (or left) hand portion of the marked landing field. Decreasing sequences of indications indicate that the movement is from the upper portion across the reflectors toward the lower portion.

Although numerous different marking or reflecting arrangements within the scope of my invention may be used to mark aircraft fields, airways and the like, I prefer to space the separate reflectors about ten to twenty feet apart and with a group spacing of forty to sixty feet. In making this choice, I am assuming an absolute velocity of about sixty miles per hour for a craft flying over the reflectors. The spacing is a function of the velocity of the beam across the reflectors and is chosen to insure an indication rate or indication sequence which can be readily observed.

Figure 6:
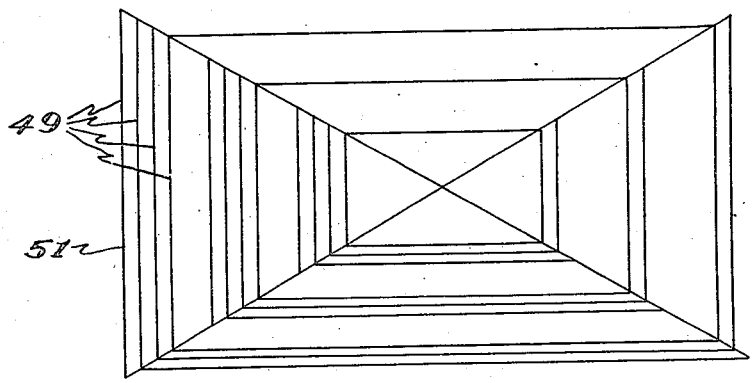
Figure 7:
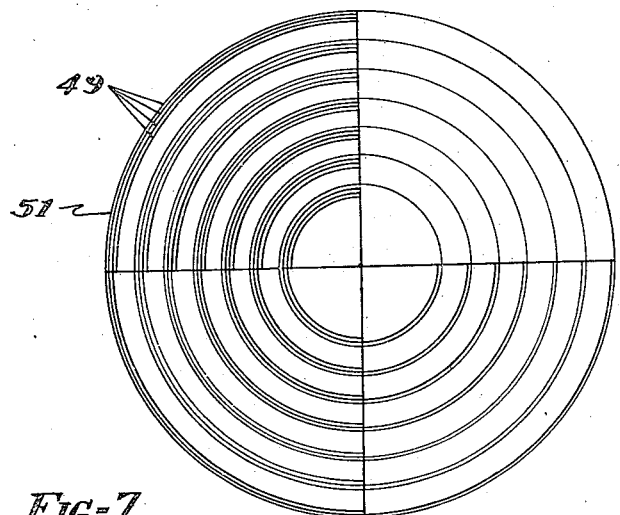

Figs. 6 and 7 indicate marking patterns which identify different portions of an airway or runway by the different sequences of reflectors. While I have chosen to mark the surface of the earth in quadrants, any suitable divisions may be used. Likewise, while I have chosen groups of four, three, etc., other combinations and other numbers of reflecting elements may be used.

One of the advantages of the foregoing system is that no servicing is required on the ground installations and each aircraft carries and maintains its own warning system. It is also apparent that the landing system does not offer any obstructions to approaching aircraft. While I have described the invention as a landing system, it may be used as an airway marker between landing fields, radio compasses, or other predetermined points.

I claim as my invention:

1. An aircraft landing system including means for transmitting an ultra high frequency radio beam from said craft, means for receiving said beam on said aircraft after said beam is reflected from the surface of the earth, and resonant means for increasing the ability of alternate portions of the earth's surface to reflect said ultra high frequency beam to produce variations in the response of such receiving means.

2. An aircraft landing system including means for transmitting an ultra high frequency radio beam from said aircraft toward the surface of the earth, means positioned on said aircraft for receiving said beam after it is reflected, and means positioned in a plurality of distinct series of spaced strips of good reflecting ability for reflecting said beam to mark the runway of an aircraft landing field, said series being identified by different arrangements of strips whereby the series causing said reflection may be identified.

3. An aircraft landing field for cooperation with aircraft radio wave transmitting and reflected radio wave receiving equipment including a runway region marked with a plurality of radio wave reflecting strips of uniform width arranged at spaced intervals normal to the length of said runway, and border regions marked with a plurality of radio wave reflecting strips arranged in differently spaced intervals normal to the length of said border regions, whereby each of said regions may be identified by characteristic variations in the response of said receiving equipment.

4. An aircraft landing field for cooperation with aircraft radio beam transmitting and reflected radio beam receiving devices including a runway marked with a plurality of radio beam reflecting strips normal to said runway and uniformly spaced by regions of relatively low reflecting ability, said runway being bordered by a plurality of non-uniformly spaced strips normal to said runway for reflecting said radio beam and producing characteristic changes in the response of said receiving device.

5. The method of determining the position of an aircraft with respect to a landing field having regions of differently arranged spaced reflecting elements thereon which comprises radiating an ultra high frequency beam from said craft, successively reflecting said beam from said spaced elements as a function of the movement of said craft, receiving said successively reflected beam on said craft, and determining the relation of said craft to said landing field by characteristic signals which are produced by said reflections from said different arrangements of reflecting elements.

6. The method of determining the relative position of an aircraft with respect to a landing field having a plurality of groups of spaced reflecting elements of successively decreasing length, thereon, which comprises radiating an ultra high frequency beam from said craft, successively reflecting said beam from a number of said elements in said groups which is a function of the lateral position of said craft with respect to said field, receiving said reflected beam on said craft, and observing its relative position with respect to said elements from the number and sequence of said reflections.

7. The method of determining the relative movement and position of an aircraft with respect to a surface of the earth having successive resonant reflecting elements in spaced order thereon which comprises radiating an ultra high radio frequency beam from said craft, successively reflecting said beam from said spaced elements as a function of the movement of said craft, receiving said reflected beam on said craft, and observing said relative movement and position from the sequence of said reflections.

ERNEST G. LINDER.